US012720648B2

(12) United States Patent
del Cueto Belchi et al.

(10) Patent No.: US 12,720,648 B2
(45) Date of Patent: Aug. 25, 2026

(54) COOKTOP DEVICE AND METHOD FOR OPERATING A COOKTOP DEVICE

(71) Applicant: BSH Hausgeräte GmbH, Munich (DE)

(72) Inventors: Alejandro del Cueto Belchi, Saragossa (ES); Jorge Español Leza, Saragossa (ES); Jorge Felices Betran, Huesca (ES); Manuel Fernandez Martinez, Saragossa (ES); Jose Miguel Gil Narvion, Saragossa (ES); Pablo Jesus Hernandez Blasco, Saragossa (ES); Eduardo Imaz Martinez, Tudela (ES); Paul Muresan, La Cartuja (ES); Jose Manuel Palacios Gasos, La Cartuja (ES); Alberto Perez Bosque, Saragossa (ES); Diego Puyal Puente, Saragossa (ES); Javier Serrano Trullen, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 837 days.

(21) Appl. No.: 18/017,686

(22) PCT Filed: Aug. 2, 2021

(86) PCT No.: PCT/EP2021/071536
§ 371 (c)(1),
(2) Date: Jan. 24, 2023

(87) PCT Pub. No.: WO2022/048839
PCT Pub. Date: Mar. 10, 2022

(65) Prior Publication Data

US 2023/0284348 A1 Sep. 7, 2023

(30) Foreign Application Priority Data

Sep. 2, 2020 (EP) .................................... 20382783

(51) Int. Cl.
*H05B 6/06* (2006.01)
*H05B 6/12* (2006.01)

(52) U.S. Cl.
CPC ........... *H05B 6/065* (2013.01); *H05B 6/1272* (2013.01)

(58) Field of Classification Search
CPC .............................. H05B 6/065; H05B 6/1272
(Continued)

(56) References Cited

U.S. PATENT DOCUMENTS 9,271,337 B2 * 2/2016 Moon .................. H05B 6/1236
2013/0248517 A1 9/2013 Moon
2021/0298134 A1 * 9/2021 Sasagawa ................ H05B 6/08

FOREIGN PATENT DOCUMENTS

EP 3028540 B1 * 3/2020 ............. H05B 6/062
EP 3641494 A1 4/2020
(Continued)

OTHER PUBLICATIONS

Translation of EP3028540, "hob apparatus", Mar. 11, 2020, By WIPO (Year: 2020).*
(Continued)

*Primary Examiner* — Quang T Van
(74) *Attorney, Agent, or Firm* — Michael E. Tschupp; Andre Pallapies; Brandon G. Braun

(57) ABSTRACT

A cooktop device includes a set of first heating units, a set of second heating units, a set of intermediate heating units arranged spatially between the set of first heating units and the set of second heating units, a set of first inverters designed to operate the set of first heating units and the set of intermediate heating units, and a set of second inverters designed to operate the set of second heating units and the set of intermediate heating units.

20 Claims, 3 Drawing Sheets

(58) Field of Classification Search
USPC ....... 219/600, 620, 621, 622, 624, 626, 627, 219/635, 676
See application file for complete search history.

(56) References Cited

FOREIGN PATENT DOCUMENTS

| | | | |
|---|---|---|---|
| EP | 3641497 | A1 | 4/2020 |
| WO | 2015015375 | A1 | 2/2015 |

OTHER PUBLICATIONS

International Search Report PCT/EP2021/071536 dated Oct. 18, 2021.

* cited by examiner

COOKTOP DEVICE AND METHOD FOR OPERATING A COOKTOP DEVICE

CROSS-REFERENCES TO RELATED APPLICATIONS

This application is the U.S. National Stage of International Application No. PCT/EP2021/071536, filed Aug. 2, 2021, which designated the United States and has been published as International Publication No. WO 2022/048839 A1 and which claims the priority of European Patent Application, Serial No. 20382783.7, filed Sep. 2, 2020, pursuant to 35 U.S.C. 119 (a)-(d).

The contents of International Application No. PCT/EP2021/071536 and European Patent Application, Serial No. 20382783.7 are incorporated herein by reference in their entireties as if fully set forth herein.

BACKGROUND OF THE INVENTION

The invention relates to a cooktop device, in particular an induction cooktop device, a cooktop with a cooktop device, and a method for operating a cooktop device.

A cooktop device is already known from the prior art which has two sets of inverters and two sets of heating units arranged in a two-by-two heating zone matrix, wherein in each case one set of heating units can only be operated by one set of inverters.

BRIEF SUMMARY OF THE INVENTION

The object of the invention consists in particular in, but is not limited to, supplying a generic device with improved properties with regard to flexibility.

A cooktop device, in particular an induction cooktop device, is proposed, with at least one set of first heating units, with at least one set of second heating units, and with at least one set of intermediate heating units, which are arranged spatially between the set of first heating units and the set of second heating units, with a set of first inverters, by means of which the set of first heating units and the set of intermediate heating units can be operated, and with a set of second inverters, by means of which the set of second heating units and the set of intermediate heating units can be operated.

An embodiment of this type makes it possible in particular to supply a cooktop device which has improved properties with regard to flexibility, namely in particular with regard to possible cookware configurations. In particular, it is possible to increase a number of heating zones which can be operated simultaneously with a different heat output. This also enables further cookware configurations to be made possible, in which in particular an increased number of cookware items are heated in each case with a different heat output. As a result, it is furthermore possible, in particular on account of the increased flexibility, to increase convenience, in particular user convenience. In addition, an embodiment of this type makes it possible in particular to achieve greater flexibility with regard to a distribution of a load over the inverters of the cooktop device. In particular, a load of the inverters of the cooktop device can be distributed more evenly over the inverters of the cooktop device. As a result, it is furthermore possible to reduce wear and in particular to increase a service life of the cooktop device. This makes it possible in particular to increase user satisfaction. In particular, high flexibility can be enabled with regard to multiplexing operation. As a result, it is possible in particular to dispense with additional inverters, which makes it possible in particular to supply a cooktop device with particularly advantageous properties with regard to cost efficiency. In particular, a possible number of heating zones operated with independent heat outputs, in which it is possible to dispense with multiplexing operation, can be increased. Furthermore, an embodiment of this type makes it possible in particular to achieve improved flexibility with regard to possible parallel operation of inverters. An embodiment of this type thus also makes it possible to achieve improved properties with regard to a heat output, in particular with regard to a boost mode. User-friendliness can thus be increased further.

A “cooktop device”, in particular an “induction cooktop device”, is to be understood to mean in particular at least a part, in particular a subassembly of a cooktop, in particular of an induction cooktop, wherein in particular accessory units for the cooktop can additionally be included, for example, a sensor unit for external measurement of a temperature of an item of cookware and/or an item of food to be cooked. In particular, the cooktop device, in particular the induction cooktop device, can also comprise the entire cooktop, in particular the entire induction cooktop.

In particular, the set of first heating units has at least one first heating unit, which is embodied in particular as an induction heating unit. The set of first heating units is preferably a group of first heating units comprising for example at least two first heating units, advantageously at least three first heating units and preferably at least four first heating units, which are embodied in particular as induction heating units. Another expedient number of first heating units of the set of first heating units would however also be conceivable.

In particular, the set of second heating units has at least one second heating unit, which is embodied in particular as an induction heating unit. The set of second heating units is preferably a group of second heating units comprising for example at least two second heating units, advantageously at least three second heating units and preferably at least four second heating units, which are embodied in particular as induction heating units. Another expedient number of second heating units of the set of second heating units would however also be conceivable.

In particular, the set of intermediate heating units has at least one intermediate heating unit, which is embodied in particular as an induction heating unit. The set of intermediate heating units is preferably a group of intermediate heating units, preferably having at least two intermediate heating units, wherein another number of intermediate heating units would also be conceivable.

A “heating unit” is to be understood to mean a consumer unit with at least one heating element. The heating element could be for example a consumer which is provided to convert electrical energy into heat. The heating unit preferably comprises at least one heating element embodied as an inductor. Here an “inductor” is to be understood to mean an element which has at least one induction coil and/or is embodied as an induction coil, and which, in at least one operating state, is provided to supply energy, in particular in the form of a magnetic alternating field, to at least one receiving element. The receiving element is embodied in particular as a part and/or a subassembly of a receiving unit and is provided in particular to receive the energy supplied by at least one inductor. The receiving unit can be in particular part of the household appliance device. Alternatively, it is conceivable for the receiving unit to be embodied as a unit which is independent of the household appliance device and/or as part of a further device which is independent of the household appliance device. The receiving unit can be provided in particular to be installed on a region above the inductor. The receiving unit could be embodied for example as an item of cookware and in particular have at least one secondary coil as a receiving element for receiving the energy supplied by the inductor and/or the further inductor. Alternatively or in addition, the receiving element could also be embodied as a metallic heating means, in particular as an at least partially ferromagnetic heating means, for instance as a ferromagnetic base of an item of cookware, in which, in an operating state, eddy currents and/or remagnetization effects are produced by the inductor and are converted into heat.

An "intermediate heating unit" is to be understood to mean a heating unit, in particular an induction heating unit, which is provided at least to heat at least one region between at least two heating units. In particular, the intermediate unit of the set of intermediate heating units is provided to heat at least one region between at least one first heating unit of the set of first heating units and at least one second heating unit of the set of second heating units.

For example, the first heating units of the set of first heating units could differ from the second heating units of the set of second heating units with regard to a provided power consumption and/or a provided power output and/or with regard to their geometry and/or their size. The first heating units of the set of first heating units are preferably embodied to be at least substantially identical to the second heating units of the set of second heating units. To this end, it would be conceivable for the intermediate heating unit of the set of intermediate heating units to differ from the first heating unit of the set of first heating units and/or the second heating unit of the set of second heating units at least with regard to geometry and/or with regard to alignment.

The expression that the intermediate heating units are arranged "spatially between the set of first heating units and the set of second heating units" is to be understood to mean that the intermediate heating units, in particular when considered in a top view of the cooktop, are surrounded at least on two sides by the set of first heating units and the set of second heating units.

An "inverter" is to be understood to mean a unit which, in at least one operating state, supplies an in particular high-frequency alternating current, in particular with a frequency of at least 10 kHz, preferably of at least 20 kHz and in particular of at most 100 kHz, for at least one further unit, in particular for at least one heating unit and/or for at least one intermediate heating unit of the cooktop device. In particular, the inverter can have inverter switching elements which can be embodied in particular as IGBT, MOSFET, HEMT, JFET and/or as TRIAC. In particular, the inverter switching elements can be formed at least in part from a semiconductor material, such as for example silicon, silicon carbide and/or gallium nitride and/or from another semiconductor material which appears expedient to a person skilled in the art.

A set of inverters has for example at least one inverter and preferably at least two inverters. In particular, the set of first inverters has at least two first inverters. Each set of inverters, in particular the set of first inverters and/or the set of second inverters, could for example be connected to a common phase of an electrical home connection. Alternatively, it would be conceivable for each set of inverters, in particular the set of first inverters and/or the set of second inverters, to be connected in each case to a separate phase of an electrical home connection.

The set of first heating units can be operated only by means of the set of first inverters. The set of second heating units can be operated only by means of the set of second inverters. Each set of heating units can preferably be operated only by means of one set of inverters.

That a heating unit and/or an intermediate heating unit "can be operated" is to be understood to mean that in at least one operating state in which at least one heating unit of a set of heating units and/or intermediate heating unit of a set of intermediate heating units is supplied with alternating current, the heating unit of a set of heating units and/or intermediate heating unit of a set of intermediate heating units is electrically assigned, in other words connected, to that inverter and/or set of inverters which supplies the heating unit and/or intermediate heating unit with alternating current.

It would be conceivable for example for the cooktop device to have a control unit which decides, as a function of a cookware configuration, which inverter of the set of first inverters operates the set of first heating units and/or the set of intermediate heating units and/or which inverter of the set of second inverters operates the set of second inverters and/or the set of intermediate heating units. A "control unit" is to be understood to mean an electronic unit which is preferably at least partially integrated into a control and/or regulation unit of a cooktop and which is preferably provided to control and/or regulate in particular at least the inverters of the set of first inverters and/or the second inverters of the set of second inverters. The control unit preferably comprises a computing unit and in particular, in addition to the computing unit, a memory unit with a control and/or regulation program stored therein, which is provided so as to be executed by the computing unit. A "cookware configuration" is to be understood to mean a number and/or a position and/or a condition of placed cookware, in particular cookware placed on the cooktop. In particular, a multiplicity of possible cookware configurations is conceivable. The cookware configuration is for example a combination of a number and/or position and/or condition of placed cookware.

"Provided" is to be understood to mean especially programmed, configured and/or equipped. An object being provided for a particular function is to be understood to mean in particular that the object fulfills and/or carries out this particular function in at least one application and/or operating state.

It is further proposed that all sets of heating units can be operated in each case as separate heating zones. As a result, it is in particular possible to achieve high flexibility, namely advantageously with regard to possible cookware configurations. An embodiment of this kind makes it possible in particular to achieve that for each set of heating units, an independent heating zone can be supplied, on the basis of which in each case at least one item of cookware can be heated with a separate heat output. For example, the set of first heating units and/or the set of second heating units and/or the set of intermediate heating units could in each case be able to be operated as a separate heating zone. A "heating zone" is to be understood in particular to mean a region, in particular a volume, preferably an area, which is provided to receive at least one object to be heated, in particular at least one item of cookware and/or at least one item of food to be cooked. In particular, in an operating state in which a heating zone is heated by a set of heating units, in particular by the set of first heating units or the set of second heating units or the set of intermediate heating units, at least 50%, in particular at least 70%, advantageously at least 80%, preferably at least 90% of a heat output of the set of heating units, in particular of the set of first heating units or of the set of second heating units, is output into the heating zone. A separate heating zone can be operated in particular with a separate heat output. In particular, all sets of heating units can be operated with a different heat output. This can be achieved in particular if all sets of heating units can in each case be operated by different inverters. A plurality of possible heating zones is preferably conceivable.

Flexibility can be increased further if all sets of heating units, in particular the set of first heating units and the set of second heating units, comprise in each case at least two heating units which can be operated in each case as separate heating zones. For example, the set of first heating units could comprise at least two first heating units, advantageously at least three first heating units and preferably at least four first heating units which can be operated in each case as separate heating zones. For example, the set of second heating units could alternatively or in addition comprise at least two second heating units, advantageously at least three second heating units and preferably at least four second heating units which can be operated in each case as separate heating zones. For example, the sets of heating units, in particular the set of first heating units and/or the set of second heating units, could comprise in each case a different number of at least two heating units which can be operated in each case as a separate heating zone. The set of first heating units and the set of second heating units preferably comprise an identical number of at least two heating units which can be operated in each case as a separate heating zone. This can be achieved in particular if at least two heating units can in each case be operated by different inverters. Alternatively or in addition, this could be achieved by way of multiplexing operation. In particular, if the set of first heating units and/or the set of second heating units comprises a number of more than two heating units, at least two first heating units and/or at least two second heating units could be able to be operated grouped together as a separate heating zone.

It is further proposed that the set of intermediate heating units can be operated in combination with the set of first heating units as one heating zone. An embodiment of this type makes it possible in particular to supply particularly high flexibility, namely in particular with regard to possible heating zones. Furthermore, an embodiment of this type makes it possible to achieve that even large items of cookware can be operated by a separate heating zone. In particular, at least one heating unit of the set of first heating units can be operated as one heating zone in combination, in other words grouped together, with at least one intermediate heating unit of the set of intermediate heating units. It is preferably possible to operate any number of, in particular adjacent, first heating units of the set of first heating units as one heating zone in combination with at least one intermediate heating unit of the set of intermediate heating units. This can be achieved in particular if at least one first heating unit of the set of first heating units and at least one intermediate heating unit of the set of intermediate heating units can be operated by means of at least one common inverter of the set of first inverters. Alternatively or in addition, this could be achieved by way of multiplexing operation.

It is also proposed that the set of intermediate heating units can be operated in combination with the set of second heating units as one heating zone. An embodiment of this type makes it possible in particular to increase flexibility further, namely in particular with regard to possible heating zones. Furthermore, an embodiment of this type makes it possible to achieve that even large items of cookware can be operated by a separate heating zone. In particular, at least one second heating unit of the set of second heating units can be operated as one heating zone in combination with at least one intermediate heating unit of the set of intermediate heating units. It is preferably possible to operate any number of, in particular adjacent, second heating units of the set of second heating units as one heating zone in combination with at least one intermediate heating unit of the set of intermediate heating units. This can be achieved in particular if at least one second heating unit of the set of second heating units and at least one intermediate heating unit of the set of intermediate heating units can be operated by means of at least one common inverter of the set of second inverters. Alternatively or in addition, this could be achieved by way of multiplexing operation.

It is further proposed that a first intermediate heating unit of the set of intermediate heating units can be operated in combination with the set of first heating units as a first heating zone, and a second intermediate heating unit of the set of intermediate heating units can be operated in combination with the set of second heating units as a second heating zone. An embodiment of this type makes it possible in particular in an operating state to operate with high flexibility, in particular to operate a large number of heating zones. This makes it possible in particular to achieve that a plurality of large items of cookware can be operated by a separate heating zone, namely in particular in an operating state. In particular, in an operating state a first intermediate heating unit of the set of intermediate heating units is operated in combination with the set of first heating units as a first heating zone, and a second intermediate heating unit of the set of intermediate heating units is operated in combination with the set of second heating units as a second heating zone. In particular, a first intermediate heating unit of the set of intermediate heating units can be operated in combination with a first heating unit of the set of first heating units as a first heating zone, and a second intermediate heating unit of the set of intermediate heating units can be operated in combination with a second heating unit of the set of second heating units as a second heating zone. Advantageously, a first intermediate heating unit of the set of intermediate heating units can be operated in combination with any number of first heating unit of the set of first heating units as a first heating zone, and a second intermediate heating unit of the set of intermediate heating units can be operated in combination with any number of second heating units of the set of second heating units as a second heating zone. It would also be conceivable that any number of intermediate heating units of the set of intermediate heating units can in each case be operated in combination with the set of first heating units as a first heating zone and/or in combination with the set of second heating units as a second heating zone. This can be achieved in particular if in an operating state at least one first heating unit of the set of first heating units and at least one intermediate heating unit of the set of intermediate heating units is operated by means of at least one common inverter of the set of first inverters and at least one second heating unit of the set of second heating units and at least one second intermediate heating unit of the set of intermediate heating units is operated by means of at least one common inverter of the set of second inverters. Alternatively or in addition, this could be achieved by way of multiplexing operation.

If the intermediate heating units of the set of intermediate heating units have an at least substantially elongated geometry, a particularly advantageous arrangement of the intermediate heating units of the set of intermediate heating units can be supplied. In particular when the intermediate heating units of the set of intermediate heating units is operated in combination with at least one heating unit of a set of heating units, a particularly advantageous heating zone geometry can be supplied. The intermediate heating units having an at least substantially "elongated geometry" is to be understood in this context to mean that the intermediate heating units have a greater length in relation to their width, namely in particular when viewed from above. "At least substantially elongated" is to be understood in this context to mean that a length of the intermediate unit is for example at least 5%, advantageously at least 10%, particularly advantageously at least 20%, preferably at least 30% and particularly preferably at least 50% longer than a width of the intermediate heating unit.

It is further proposed that the intermediate heating units of the set of intermediate heating units are arranged parallel to a depth direction of a cooktop with regard to their main extent. This makes it possible to further improve an arrangement of the intermediate heating units of the set of intermediate heating units. In particular when the intermediate heating units of the set of intermediate heating units is operated in combination with at least one heating unit of a set of heating units, an even more advantageous heating zone geometry can be supplied. This makes it possible in particular to achieve that any item of cookware can be heated with the greatest possible area coverage. In turn, this also makes it possible in particular to increase efficiency. A "main extent" of the intermediate heating unit and or the heating unit is to be understood here to mean an extent which runs parallel to a longest edge of a smallest notional cuboid, which only just fully encloses the intermediate heating unit and/or the heating unit. Advantageously, the intermediate heating units of the set of intermediate heating units are arranged at least substantially at right angles to the first heating units of the set of first heating units with respect to their main extent. "At least substantially at right angles" is to be understood in this context to mean that a deviation from a right angle amounts in particular to less than 25%, preferably less than 10%, and particularly preferably less than 5%.

It is further proposed that the intermediate heating units of the set of intermediate heating units are arranged adjacent to a plurality of first heating units of the set of first heating units and/or adjacent to a plurality of second heating units of the set of second heating units. Advantageously, at least one intermediate heating unit of the set of intermediate heating units is arranged adjacent to at least two and preferably at least three first heating units of the set of first heating units. In addition, at least one second intermediate heating unit of the set of intermediate heating units is arranged adjacent to at least two and preferably at least three second heating units of the set of second heating units. "Adjacent" is to be understood in this context to mean that a distance between the intermediate heating units of the set of intermediate heating units and the first heating units of the set of first heating units and/or the second heating units of the set of second heating units amounts for example to less than 15 cm, advantageously less than 10 cm, particularly advantageously less than 5 cm, preferably less than 3 cm and particularly preferably less than 1 cm.

It is further proposed that the cooktop device has a set of third heating units and a set of further intermediate heating units, which is arranged between the set of second heating units and the set of third heating units. An embodiment of this type makes it possible to further increase flexibility in particular. It is also possible to further improve convenience, in particular user convenience. Furthermore, an embodiment of this type makes it possible in particular to supply a cooktop device which has a high number of heating zones.

It is further proposed that the cooktop device comprises a set of third inverters, wherein the set of further intermediate heating units can be operated by the set of second inverters and the set of third inverters. As a result, it is possible in particular to supply a cooktop device with particularly advantageous properties with regard to flexibility. In particular, it is possible to achieve a high number of heating zones which are operated in each case with a separate heat output. As a result, it is also possible to further increase convenience, in particular user convenience. Furthermore, it is possible to achieve advantageous properties with regard to an in particular even distribution of electrical load over a larger number of sets of inverters, as a result of which it is possible in particular to further increase service life and also cost efficiency.

It is also proposed that the set of third heating units can be operated by the set of third inverters, namely that the set of third heating units can be operated exclusively by the set of third inverters. As a result, it is possible to achieve particularly advantageous properties with regard to efficiency. The properties described for the set of first heating units, the set of second heating units, the set of intermediate heating units, the set of first inverters and the set of second inverters preferably apply in an analogous manner to the set of third heating units, the set of further intermediate heating units and the set of third inverters. For example, the cooktop device could comprise any number of further sets of heating units and/or further sets of intermediate heating units and/or further sets of inverters which are embodied in an analogous manner.

A cooktop, in particular an induction cooktop, with at least one cooktop device is also proposed. This makes it possible to further increase flexibility. In addition, this makes it possible in particular to increase user satisfaction.

The invention further relates to a method for operating a cooktop device, in particular an induction cooktop device, with at least one set of first heating units, with at least one set of second heating units and with at least one set of intermediate heating units which are arranged spatially between the set of first heating units and the set of second heating units, with a set of first inverters which in at least one operating state operate the set of first heating units, namely for example at least one first heating unit, preferably at least two first heating units, the set of first heating units and the set of intermediate heating units, namely in particular at least one intermediate heating unit of the set of intermediate heating units, and with a set of second inverters, which in the operating state operate the set of second heating units, namely for example at least one second heating unit, preferably at least two second heating units, the set of second heating units and the set of intermediate heating units, namely in particular at least one second intermediate heating unit of the set of intermediate heating units. An embodiment of this type makes it possible in particular to achieve particularly high flexibility.

In this context, the cooktop device, the cooktop and the method for operating the cooktop device should not be restricted to the use and embodiment described above. In particular, the cooktop device, the cooktop and the method for operating the cooktop device can have a number of individual elements, parts, units and method steps deviating from a number mentioned herein for fulfilling a mode of operation described herein.

Further advantages result from the following description of the figures. The figures show two exemplary embodiments of the invention. In order to differentiate the exemplary embodiments, the letters a and b are appended to the reference characters in the following description of the figures. In principle, reference should be made to the description and/or the drawings of the first exemplary embodiment with the letter a in respect of components with the same designation, in particular in respect of components with the same reference characters. The descriptions of the further exemplary embodiments are restricted substantially to the differences between the exemplary embodiments. The figures, the description of the figures and the claims contain numerous features in combination. The person skilled in the art will expediently also consider the features individually and combine them to form useful further combinations.

DETAILED DESCRIPTION OF EXEMPLARY EMBODIMENTS OF THE PRESENT INVENTION

Figure 1:
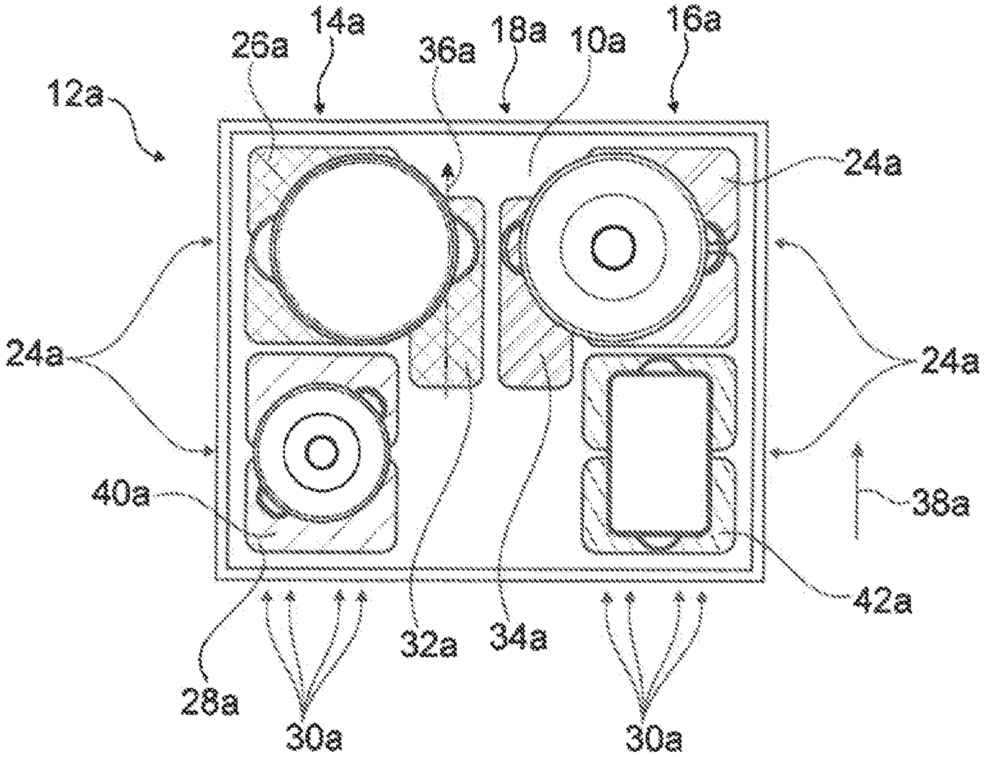
FIG. 1 shows a top view of a cooktop which is embodied as an induction cooktop, with a cooktop device in an exemplary operating state.

Only one of the objects present multiple times in the figures is provided with a reference character in each case.

FIG. 1 shows a cooktop 10*a*, which is embodied as an induction cooktop in the example shown. The cooktop 10*a* has a cooktop device 12*a*. The cooktop device 12*a* is embodied by way of example as an induction cooktop device. The cooktop device 12*a* shown in FIG. 1 is in an exemplary operating state.

The cooktop device 12*a* has a set of first heating units 14*a*. In the example shown, the set of first heating units 14*a* has a number of four first heating units 40*a*.

The cooktop device 12*a* also has a set of second heating units 16*a*. In the example shown, the set of second heating units 16*a* has a number of four second heating units 42*a*.

The cooktop device 12*a* also has a set of intermediate heating units 18*a*. In the example shown, the set of intermediate heating units 18*a* has a number of two intermediate heating units, namely one first intermediate heating unit 32*a* and one second intermediate heating unit 34*a*.

The intermediate heating units 32*a*, 34*a* of the set of intermediate heating units 18*a* are arranged spatially between the first heating units 40*a* of the set of first heating units 14*a* and the second heating units 42*a* of the set of second heating units 16*a*.

The intermediate heating units 32*a*, 34*a* of the set of intermediate heating units 18*a* have an at least substantially elongated geometry.

The intermediate heating units 32*a*, 34*a* of the set of intermediate heating units 18*a* are arranged parallel to a depth direction 38*a* of the cooktop 10*a* with regard to their main extent 36*a*.

The intermediate heating units 32*a*, 34*a* of the set of intermediate heating units 18*a* are namely arranged at least substantially at right angles to the first heating units 40*a* of the set of first heating units 14*a* with respect to their main extent 36*a*.

The intermediate heating units 32*a*, 34*a* of the set of intermediate heating units 18*a* are arranged adjacent to a plurality of first heating units 40*a* of the set of first heating units 14*a* and adjacent to a plurality of second heating units 42*a* of the set of second heating units 16*a*.

In the example shown, the first intermediate heating unit 32*a* of the set of intermediate units 18*a* is arranged adjacent to three first heating units 40*a* of the set of first heating units 14*a*. In addition, the second intermediate heating unit 34*a* of the set of intermediate units 18*a* is arranged adjacent to three second heating units 42*a* of the set of second heating units 16*a*.

Figure 2:
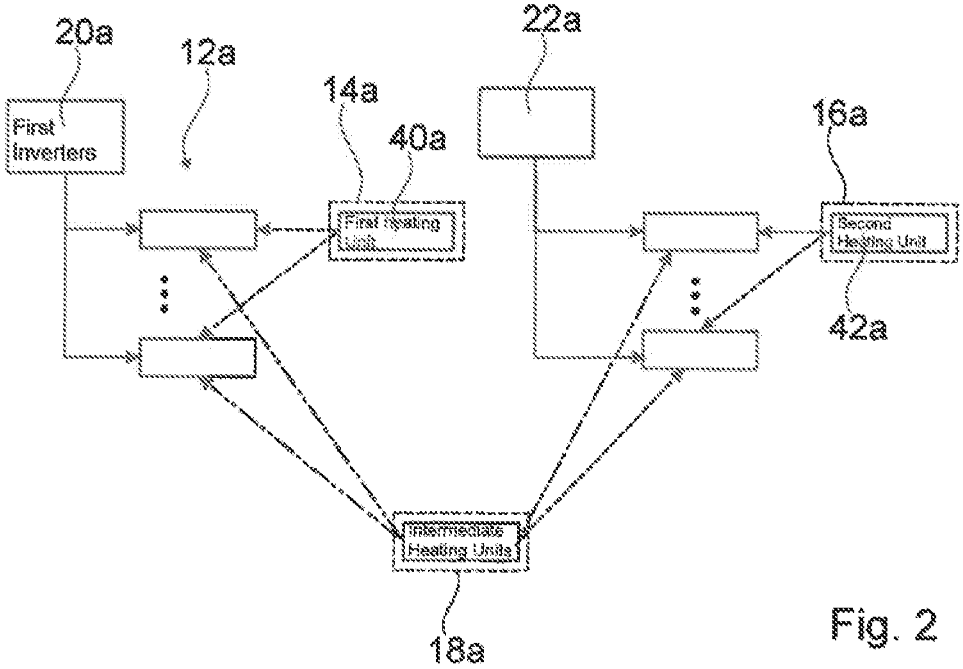
FIG. 2 shows a further simplified representation of the cooktop device with a set of first heating units, with a set of second heating units and with a set of intermediate heating units.

FIG. 2 further shows, in schematic form and for the sake of clarity, representatively on the basis of in each case one first heating unit of the set of first heating units, one intermediate heating unit of the set of intermediate heating units, and one second heating unit of the set of second heating units, which sets of inverters can be used to operate the sets of heating units, wherein this applies in each case to all first heating units of the set of first heating units, to all second heating units of the set of second heating units, and all intermediate heating units of the set of intermediate heating units.

The cooktop device 12*a* also has a set of first inverters 20*a*. The set of first heating units 14*a* can be operated by means of the set of first inverters 20*a*, namely by means of any inverters of the set of first inverters. The set of intermediate heating units 18*a* can also be operated by means of the set of first inverters 20*a*, namely by means of any inverters of the set of first inverters. The set of first heating units 14*a* can be operated only by means of the set of first inverters 20*a*.

The cooktop device 12*a* also has a set of second inverters 22*a*. The set of second heating units 16*a* can be operated by means of the set of second inverters 22*a*, namely by means of any inverters of the set of second inverters. The set of intermediate heating units 18*a* can also be operated by means of the set of second inverters 22*a*, namely by means of any inverters of the set of second inverters. The set of second inverters 22*a* can be operated only by means of the set of second inverters 22*a*.

All sets of heating units, namely in the example shown the set of first heating units 14*a*, the set of second heating units 16*a* and the set of intermediate heating units 18*a*, can in each case be operated as separate heating zones 24*a* (cf. FIGS. 1 and 2). In the operating state shown in FIG. 1, the heating zones 24*a* are indicated by different hatching. This is an exemplary operating state, wherein a multiplicity of further combinations and heating zones 24*a* are possible.

In addition, all sets of heating units 16*a*, 18*a* in each case comprise four heating units 30*a* which can in each case be operated as separate heating zones 24*a*, 24*b*.

The set of intermediate heating units 18*a* can be operated in combination with the set of first heating units 14*a* as one heating zone 24*a*. This can be achieved in that the set of intermediate units 18*a* and the set of first heating units 14*a* can be operated by means of the set of first inverters 20*a*, namely in particular by means of one or several common inverters of the set of first inverters 20*a* (cf. FIG. 2).

In addition, the set of intermediate heating units 18*a* can be operated in combination with the set of second heating units 16*a* as one heating zone 24*a*. This can be achieved in that the set of intermediate units 18*a* and the set of second heating units 16*a* can be operated by means of the set of second inverters 22*a*, namely in particular by means of one or several common inverters of the set of second inverters 22*a*.

In addition, a first intermediate heating unit 32*a* of the set of intermediate heating units 18*a* can be operated in combination with the set of first heating units 14*a* as a first heating zone 26*a*, and a second intermediate heating unit 34*a* of the set of intermediate heating units 18*a* can be operated in combination with the set of second heating units 16*a* as a second heating zone 28*a*. By way of example, heating zones 24*a* are represented by in each case similar hatching in FIG. 1.

Figure 3:
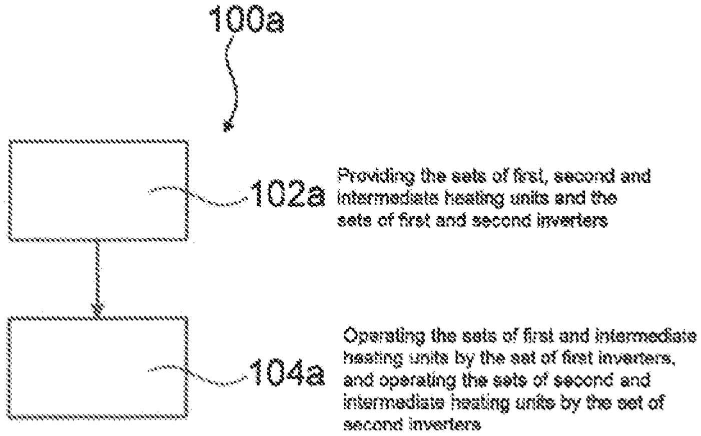
FIG. 3 shows a flowchart of a method for operating the cooktop device.

FIG. 3 shows a flowchart of a method 100*a* for operating the cooktop device 12*a*. The method 100*a* has in particular a method step 102*a* and a further method step 104*a*.

In the method step 102*a*, the cooktop device 12*a* is supplied with the set of first heating units 14*a*, with the set of second heating units 16*a* and with the set of intermediate heating units 18*a*, which are arranged spatially between the set of first heating units 14*a*, 14*b* and the set of second heating units 16*a*, 16*b*, with the set of first inverters 20*a*, 20*b*, and with the set of second inverters 22*a*, 22*b*.

In the further method step 104*a*, the set of first heating units 14*a* and the set of intermediate heating units 18*a* are operated by means of the set of first inverters 20*a*. In addition, the set of second heating units 16*a* and the set of intermediate heating units 18*a* are operated by means of the set of second inverters 22*a*.

Figure 4:
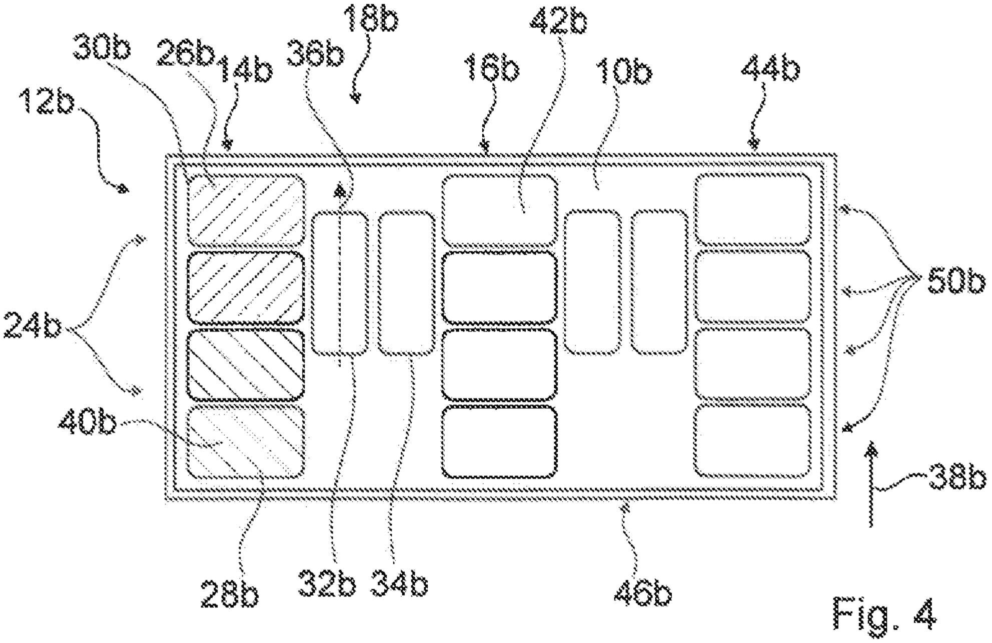
FIG. 4 shows a top view of a further cooktop which is embodied as an induction cooktop, with a further cooktop device of a further exemplary embodiment.
Figure 5:
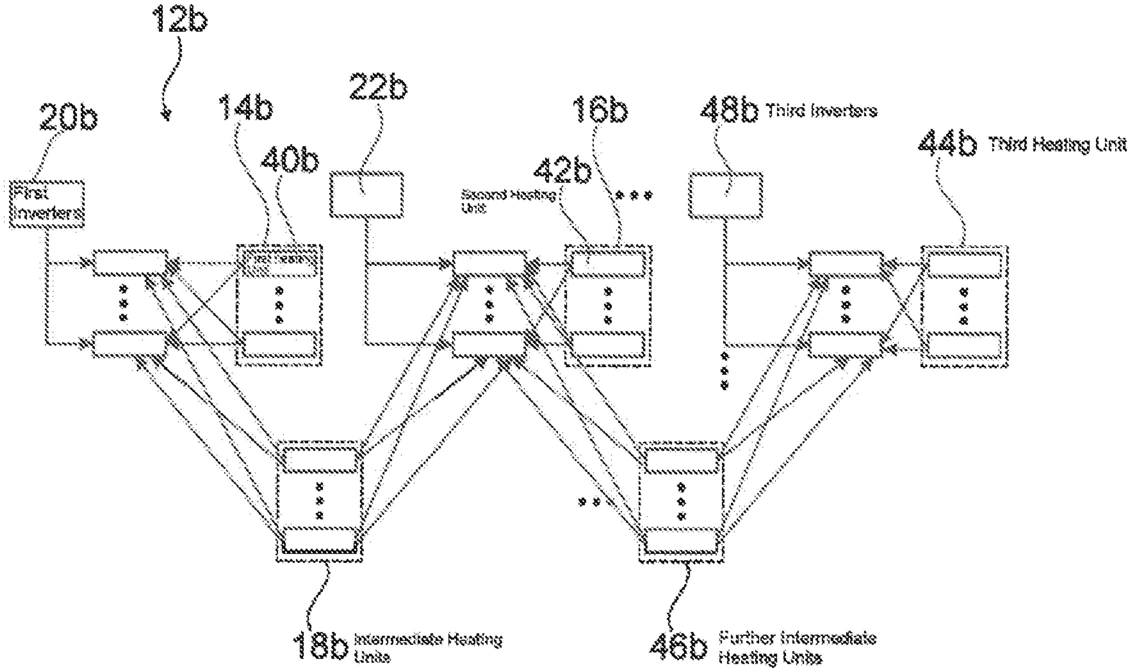
FIG. 5 shows a simplified representation of the further cooktop device, with a set of further intermediate heating units, with a set of third heating units and with a set of third inverters.
Figure 6:
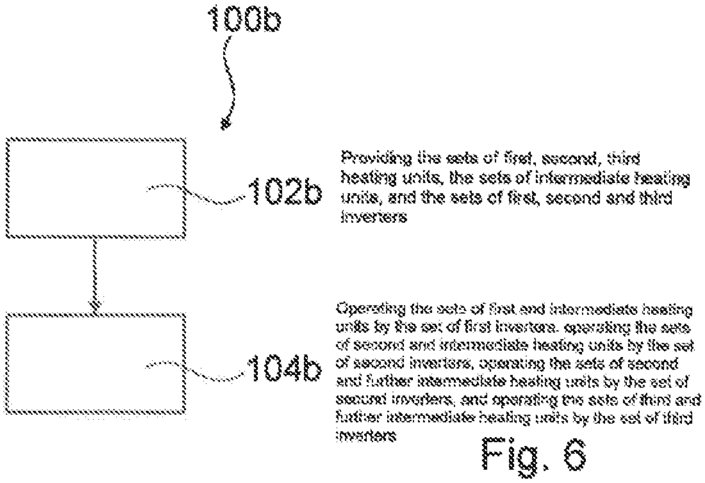
FIG. 6 shows a flowchart of a method for operating the further cooktop device.

A further exemplary embodiment of the invention is shown in FIGS. 4 to 6. The following descriptions are substantially restricted to the differences between the exemplary embodiments, wherein with regard to components, features and functions which remain the same, reference can be made to the description of the exemplary embodiment in FIGS. 1 to 3. In order to differentiate the exemplary embodiments, the letter a in the reference characters of the exemplary embodiment in FIGS. 1 to 3 is replaced by the letter b in the reference characters of the exemplary embodiment of FIGS. 4 to 6. In principle, reference can also be made to the drawings and/or the description of the exemplary embodiment in FIGS. 1 to 3 in respect of components with the same designation, in particular in respect of components with the same reference characters.

FIG. 4 shows a cooktop 10*b*, which is likewise embodied as an induction cooktop in the example shown. The cooktop 10*b* has a cooktop device 12*b*. The cooktop device 12*b* is embodied by way of example as an induction cooktop device.

The cooktop device 12*b*, in addition to a set of first heating units 14*b* and a set of second heating units 16*b*, also has a set of third heating units 44*b*.

Furthermore, the cooktop device 12*b*, in addition to a set of intermediate heating units 18*b*, has a set of further intermediate heating units 46*b*.

In the example shown, the set of first heating units 14*b* has four first heating units 40*b*. In the example shown, the set of second heating units 16*b* has four second heating units 42*b*. In the example shown, the set of third heating units 44*b* has four third heating units 50*b*.

In the example shown, the set of intermediate heating units 18*b* and the set of further intermediate heating units 46 have in each case two intermediate heating units.

The set of further intermediate heating units 46*b* is arranged between the set of second heating units 16*b* and the set of third heating units 44*b*.

The cooktop device 12*b*, in addition to a set of first inverters 20*b* and a set of second inverters 22*b*, also has a set of third inverters 48*b*.

The set of further intermediate heating units 46*b* can be operated by the set of second inverters 22*b* and the set of third inverters 48*b* (cf. FIG. 5).

The set of third heating units 44*ba* can be operated only by the set of third inverters 48*b*.

The extent to which the cooktop device 12*b* is scalable in particular with regard to a number of sets of heating units and/or with regard to a number of sets of intermediate units and/or with regard to a number of sets of inverters is shown by way of dots in FIG. 5.

FIG. 6 shows a flowchart of a method 100*b* for operating the cooktop device 12*b*. The method 100*b* has in particular a method step 102*b* and a further method step 104*b*.

In the method step 102*b*, the cooktop device 12*b* is supplied with the set of first heating units 14*b*, with the set of second heating units 16*b*, with the set of third heating units 44*b* and with the set of intermediate heating units 18*a*, which are arranged spatially between the set of first heating units 14*b* and the set of second heating units 16*b*, and with the set of further intermediate heating units 46*b*, which are arranged spatially between the set of second heating units 16*b* and the set of third heating units 44*b*, with the set of first inverters 20*b*, with the set of second inverters 22*b*, and with the set of third inverters 48*b*.

In the further method step 104*b*, the set of first heating units 14*b* and the set of intermediate heating units 18*b* are operated by means of the set of first inverters 20*b*. In addition, the set of second heating units 16*b* and the set of intermediate heating units 18*b* are operated by means of the set of second inverters 22*b*. In addition, the set of second heating units 16*b* and the set of further intermediate heating units 46*b* are operated by means of the set of second inverters 22*b*. Furthermore, the set of third heating units 44*b* and the set of further intermediate heating units 46*b* are operated by means of the set of third inverters 48*b*.

The invention claimed is:

1. A cooktop device, comprising:

a set of first heating units;

a set of second heating units;

a set of intermediate heating units arranged spatially between the set of first heating units and the set of second heating units;

a set of first inverters designed to operate the set of first heating units and the set of intermediate heating units; and a set of second inverters designed to operate the set of second heating units and the set of intermediate heating units, wherein no inverter of the set of first inverters is configured to operate any heating unit of the set of second heating units, and no inverter of the set of second inverters is configured to operate any heating unit of the set of first heating units.

2. The cooktop device of claim 1, constructed in a form of an induction cooktop device.

3. The cooktop device of claim 1, wherein the first, second and intermediate sets of heating units are each designed to operate as separate heating zones.

4. The cooktop device of claim 1, wherein the first, second and intermediate sets of heating units comprise each at least two heating units which are designed to operate as separate heating zones.

5. The cooktop device of claim 1, wherein the first and second sets of heating units comprise each at least two heating units which are designed to operate as separate heating zones.

6. The cooktop device of claim 1, wherein the set of intermediate heating units is designed to operate in combination with the set of first heating units as one heating zone.

7. The cooktop device of claim 1, wherein the set of intermediate heating units is designed to operate in combination with the set of second heating units as one heating zone.

8. The cooktop device of claim 1, wherein the set of intermediate heating units comprises a first intermediate heating unit designed to operate in combination with the set of first heating units as a first heating zone, and a second intermediate heating unit designed to operate in combination with the set of second heating units as a second heating zone.

9. The cooktop device of claim 8, wherein the first and second intermediate heating units of the set of intermediate heating units have an at least substantially elongated geometry.

10. The cooktop device of claim 8, wherein the first and second intermediate heating units of the set of intermediate heating units are arranged parallel to a depth direction of a cooktop with regard to their main extent.

11. The cooktop device of claim 8, wherein the first and second intermediate heating units of the set of intermediate heating units are arranged adjacent to a plurality of first heating units of the set of first heating units and/or adjacent to a plurality of second heating units of the set of second heating units.

12. The cooktop device of claim 1, further comprising:

a set of third heating units; and a set of further intermediate heating units arranged between the set of second heating units and the set of third heating units.

13. The cooktop device of claim 12, further comprising a set of third inverters, the set of further intermediate heating units designed to be operated by the set of second inverters and the set of third inverters.

14. The cooktop device of claim 13, wherein the set of third heating units is designed to be operated by the set of third inverters.

15. A cooktop, comprising a cooktop device, said cooktop device comprising:

a set of first heating units;

a set of second heating units;

a set of intermediate heating units arranged spatially between the set of first heating units and the set of second heating units;

a set of first inverters designed to operate the set of first heating unit and the set of intermediate heating units; and a set of second inverters designed to operate the set of second heating units and the set of intermediate heating units, wherein no inverter of the set of first inverters is configured to operate any heating unit of the set of second heating units, and no inverter of the set of second inverters is configured to operate any heating unit of the set of first heating units.

16. The cooktop of claim 15, constructed in a form of an induction cooktop.

17. A method for operating a cooktop device which comprises a set of first heating units, a set of second heating units, a set of intermediate heating units arranged spatially between the set of first heating units and the set of second heating units, said method comprising:

operating the set of first heating units and a set of intermediate heating units by a set of first inverters in an operating state; and operating the set of second heating units and the set of intermediate heating units by a set of second inverters in the operating state, wherein no inverter of the set of first inverters is configured to operate any heating unit of the set of second heating units, and no inverter of the set of second inverters is configured to operate any heating unit of the set of first heating units.

18. The method of claim 17 for operating an induction cooktop device.

19. The method of claim 17, further comprising operating each of at least the first and second sets of heating units as separate heating zones.

20. The method of claim 17, further comprising operating the set of intermediate heating units as one heating zone in combination with the set of first heating units or the set of second heating units.

* * * * *